United States Patent [19]
Dörner

[11] Patent Number: 5,799,567
[45] Date of Patent: Sep. 1, 1998

[54] FOOD PROCESSOR WITH A MIXING VESSEL AND A DRIVE MECHANISM FOR AN AGITATOR IN THE MIXING VESSEL

[75] Inventor: Stefan Dörner, Solingen, Germany

[73] Assignee: Vorwerk & Co. Interholding GmbH, Wuppertal, Germany

[21] Appl. No.: 737,102

[22] PCT Filed: Apr. 28, 1995

[86] PCT No.: PCT/EP95/01635

§ 371 Date: Mar. 14, 1997

§ 102(e) Date: Mar. 14, 1997

[87] PCT Pub. No.: WO95/29617

PCT Pub. Date: Nov. 9, 1995

[30] Foreign Application Priority Data

Apr. 28, 1994 [DE] Germany .................. 44 14 824.0

[51] Int. Cl.$^6$ .................. A47J 43/04; A47J 43/07; G01G 19/00
[52] U.S. Cl. .................. 99/348; 99/409; 99/511; 177/132; 177/245; 366/141; 366/146; 366/314
[58] Field of Search .................. 99/326–331, 348, 99/352–355, 495, 509–513, 476, 409; 210/360.1, 380.1, 369, 379; 241/37.5, 92, 282.1; 219/400, 415, 432, 433, 461, 521, 429; 177/245, 132; 366/143, 314, 144–146, 601, 246–251, 141; 426/243, 519, 523

[56] References Cited

U.S. PATENT DOCUMENTS

| 5,228,381 | 7/1993 | Virgilio et al. .................. 99/331 |
| 5,535,665 | 7/1996 | Wong .................. 99/348 |

FOREIGN PATENT DOCUMENTS

| 0396059 | 11/1990 | European Pat. Off. . |
| 0499062 | 8/1992 | European Pat. Off. . |
| 0561259 | 9/1993 | European Pat. Off. . |
| 2651982 | 3/1991 | France . |
| 3148585 | 6/1983 | Germany . |
| 1894430 | 6/1994 | Germany . |

*Primary Examiner*—Timothy F. Simone
*Attorney, Agent, or Firm*—Martin A. Farber

[57] ABSTRACT

The invention concerns a food processor (1) with a mixing vessel (6) and a drive mechanism (8) for an agitator (10) in the mixing vessel (6), the lower region of which can be heated. As an improvement on a food processor (1) of this type, it is proposed that a weighing device (16) should be provided and that the weighing device (16) should determine the weight of a mixing pot support (7) including a heating unit (40).

17 Claims, 11 Drawing Sheets

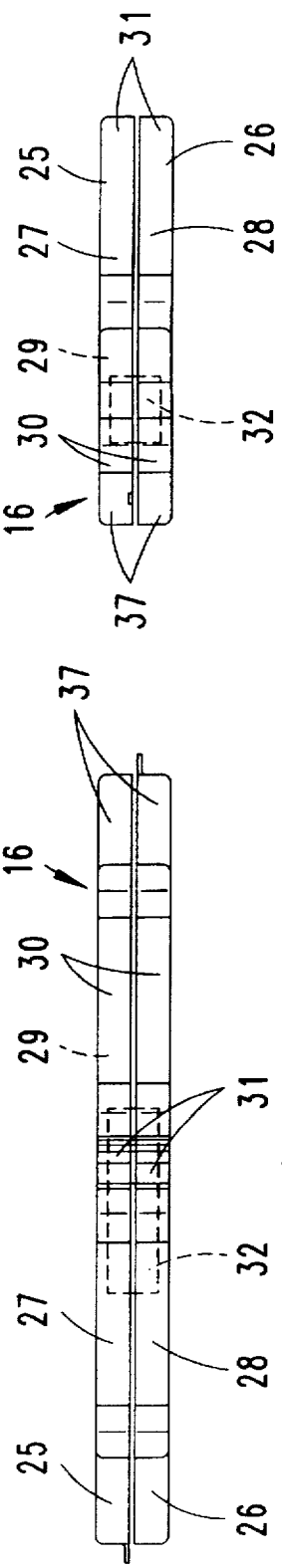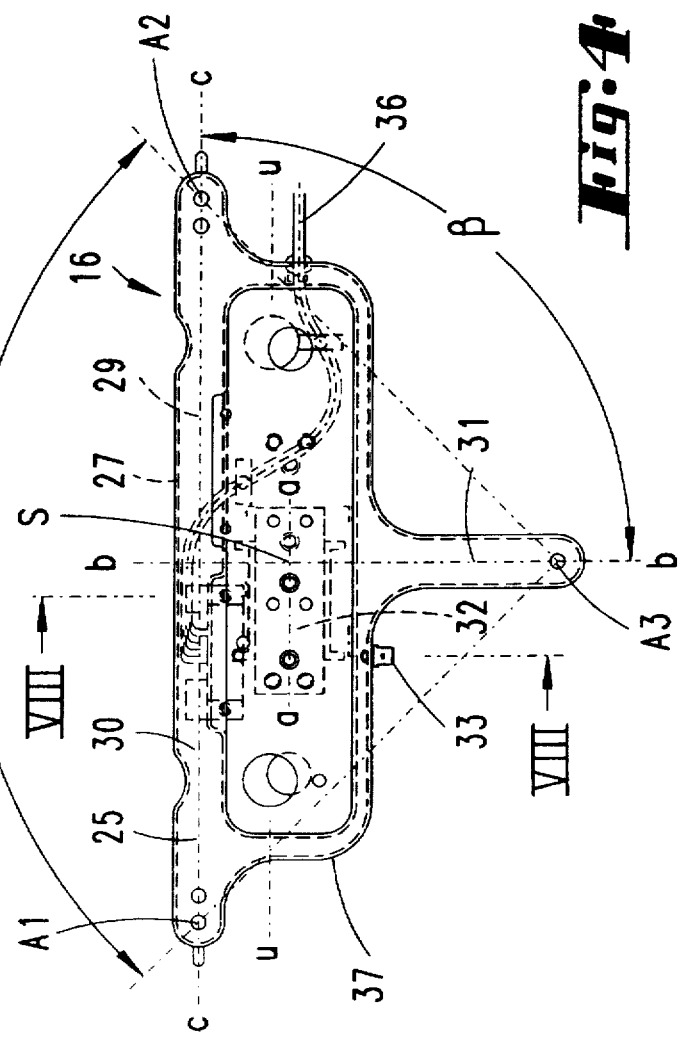

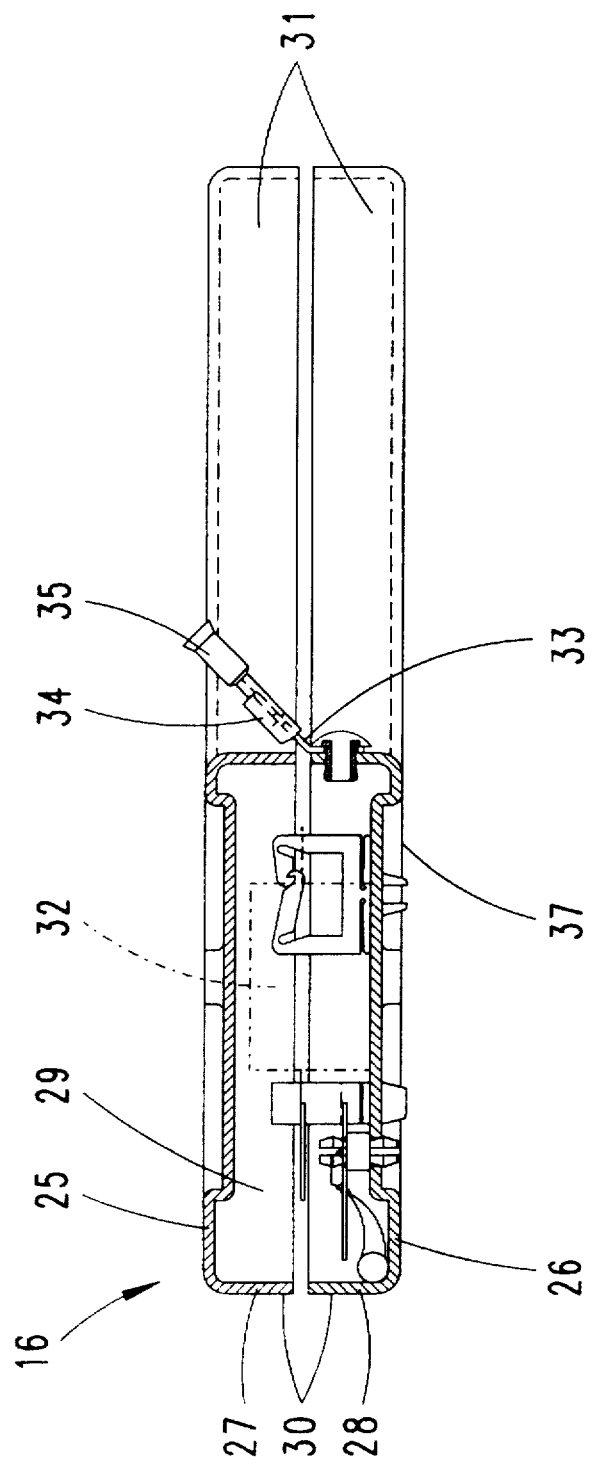

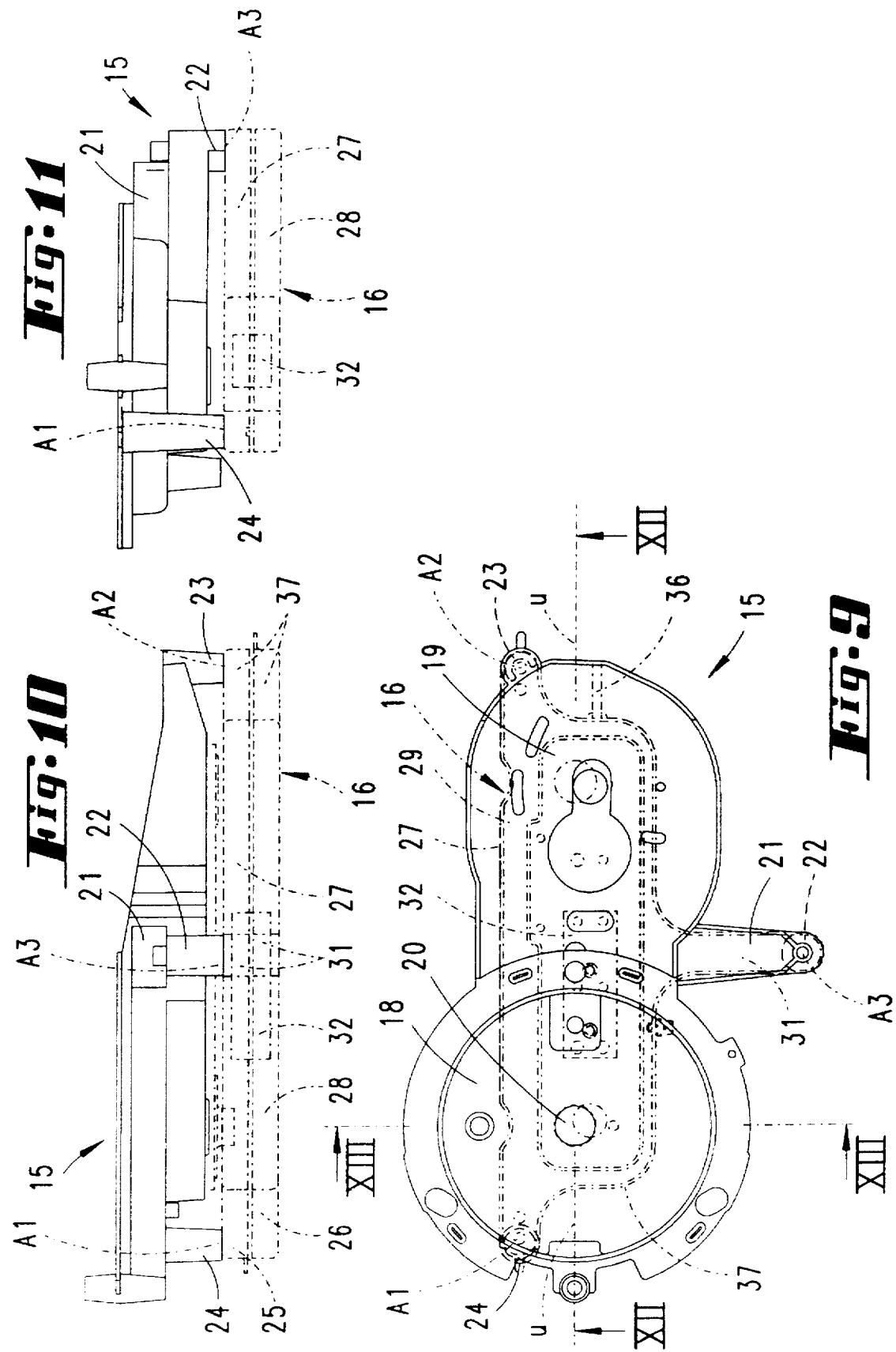

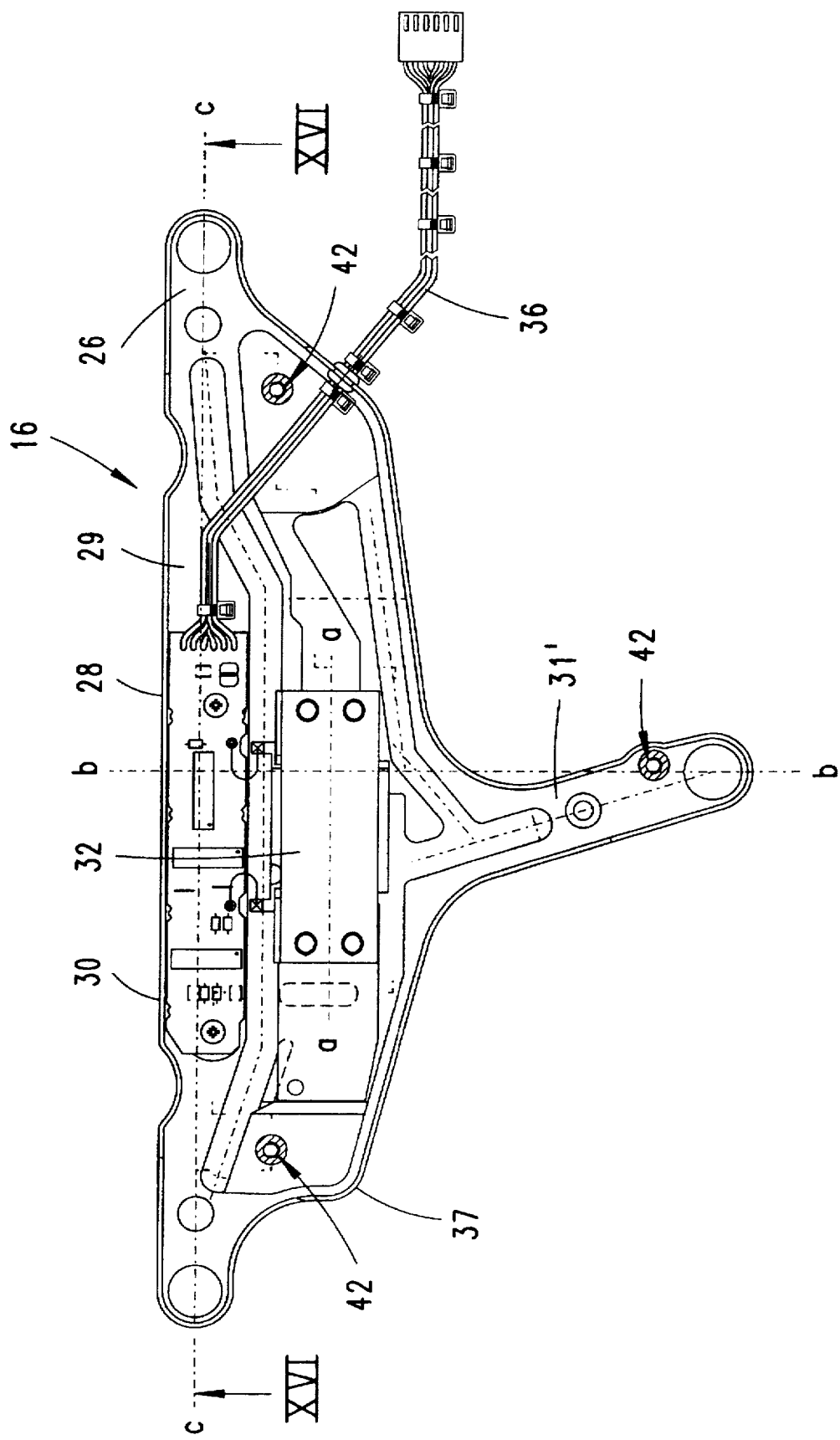

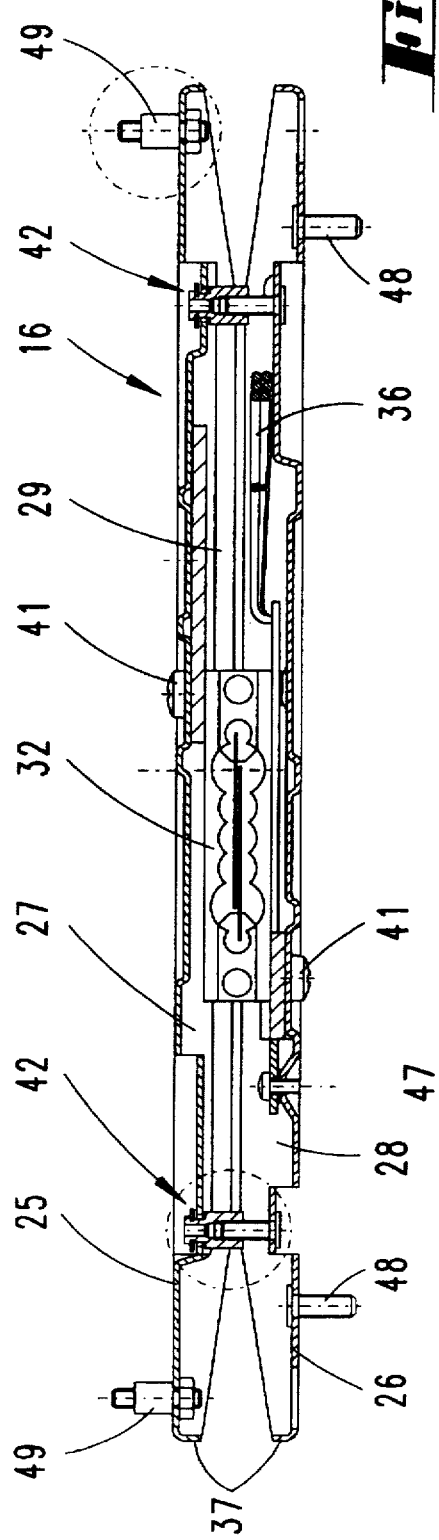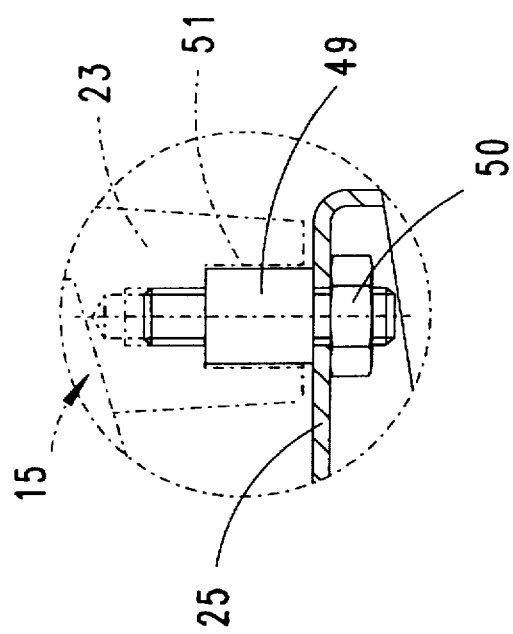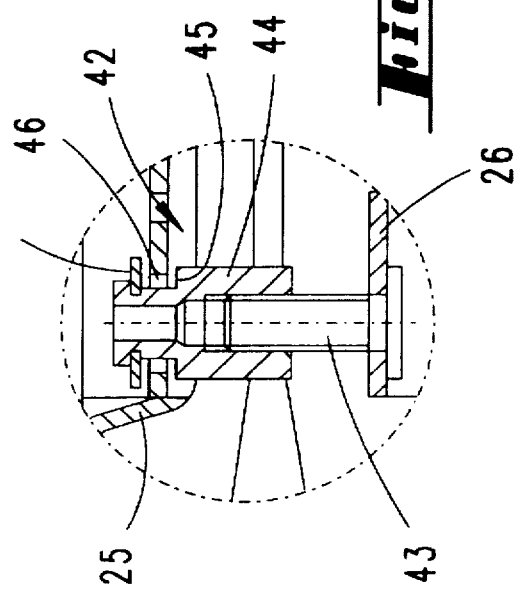

FOOD PROCESSOR WITH A MIXING VESSEL AND A DRIVE MECHANISM FOR AN AGITATOR IN THE MIXING VESSEL

FIELD AND BACKGROUND OF THE INVENTION

The invention relates to a food processor comprising a mixing vessel and a drive mechanism for an agitator in the mixing vessel, the mixing vessel being heatable in its lower region.

A food processor of this kind is known from EP-A 0561259. There is in question here a food processor for the processing of foodstuffs, which has a weighing device with a force-absorbing element, by which weighing device there may be determined and displayed the weight of foodstuff present in a mixing vessel. In the weighing operation, the mixing vessel is carried by the force-absorbing element, which, for its part, is connected to a pedestal for the unit. Between the force-absorbing element and the mixing vessel, there are provided bearing elements displaceable vertically against the force of a biased spring. The mixing vessel, when weighing, lies loose on the bearing elements, and is lockable to the pedestal of the unit for the purpose of operation of the food processor. The force-absorbing element comprises a weighing beam secured to the pedestal for the unit, with, fixed to the weighing beam, strain gauges whose signal is evaluated and displayed by an electronic circuit.

SUMMARY OF THE INVENTION

It is the task of the present invention to provide a food processor of this type in advantageous manner.

As a result of the arrangement of the invention, there is provided an advantageous development of the subject matter of the invention. This is solved in that a weighing device is provided and that the weighing device records the weight of a mixing bowl support, including a heating unit. The food processor has a mixing bowl support which, in operation of the food processor, holds the mixing vessel frictionally. This mixing bowl support is encompassed by a heating unit, in particular by a resistance heating wire or the like, for heating of the lower region of the mixing vessel. The weighing device records, according to the invention, the weight of the mixing bowl support, including the heating unit encompassing the latter, and of the mixing vessel. To display the weight, there may be provided a digital display located in the unit housing. After switching on of the food processor, this digital display first displays a tare point. An electronic circuit is correspondingly so arranged that a weight display is only effected after depression of a corresponding button, after which zero grams is first displayed. Further weighing can now be done, wherein it is proposed, according to the invention, that weighing may take place, in one weighing step, up to 2.5 kg, and in total, up to 7.5 kg. For this purpose, it may be provided that the weight display is fitted with a reset button, in order, after filling of foodstuffs or the like into the mixing vessel, the weight display may again be set to zero. In a preferred embodiment of the subject matter of the invention, it is provided that the weighing device supports the parts to be weighed by means of a three-point bearing. The weighing device records, accordingly, the weight of the mixing bowl support, including the heating unit encompassing the latter, and that of the mixing vessel, by means of three bearing points.

It is thus proposed that the bearing points are each associated with end regions of the weighing device. For example, the weighing device may be formed in such a way that it has three arms, in whose end regions there are located the respective bearing points. In order to intercept, as far as possible any vibrations which may be caused by the agitator drive mechanism, it is further proposed that the bearing points are each fitted with a damping element. These damping elements may, for example, be rubber buffers, by means of which the subassemblies to be mounted are secured to the weighing housing. Advantageously, it is provided that the weighing device records the weight of the drive mechanism. The drive mechanism for the agitator in the mixing vessel is, in a preferred embodiment, an electric motor, which drives the mixing vessel by means of a toothed belt or the like. In addition to the weights of the mixing vessel and of the mixing bowl support, it may also be provided that the weight of the drive mechanism is likewise recorded by the weighing device. Also this own weight of the drive mechanism is allowed for in the weight display, so that after switching on of the food processor, there is first displayed the tare point. Furthermore, it is proposed that a weighing beam is provided and that the weighing beam is aligned along an axial elongate extent between the agitator and the drive mechanism. A weighing beam of this kind may be constructed in known manner and provided with strain gauges. The signals of the strain gauges are evaluated by an electronic circuit and brought to the display. Preferred is an embodiment in which the weighing beam is provided with a capacitive measurement sensor, the distance between two capacitor plates thus changing with change in weight.

Because of the arrangement of the weighing beam along an axial elongate extent between the agitator and the drive mechanism, tipping forces in the region of the weighing beam are kept very slight. It proves especially advantageous in this for the mixing bowl to be of oval shape in plan view and for the weighing beam to be aligned along the greater axis in plan view. The oval shape of the mixing vessel in plan view is so dimensioned here, for example, that a ratio of lesser axis to the greater axis amounts to approximately 1:1.2 to 1:1.5. Also, in this connection, because of the alignment of the weighing beam along the greater axis in plan view, the tipping forces are kept relatively slight. The greater axis in plan view of the mixing vessel coincides, furthermore, with the axial elongate direction between the agitator and the drive mechanism. In advantageous manner, it is provided that the weighing beam is accommodated in a weighing housing having a horizontal division. By soiling, such as fat deposits for example, on the weighing beam, the weight indications may be misrepresented. To counteract this, the weighing beam is accommodated in a weighing housing, by virtue of which the weighing beam is protected against soiling. The weighing housing has a horizontal division and is preferably formed divided in two. For this purpose, it is proposed that the weighing housing has an upper and a lower portion, which two housing portions are joined together only by means of the weighing beam. To protect the lower and the upper housing portion and also the weighing beam from non-permissible deformation, it is proposed that an upper portion of the weighing housing is held captive on a lower portion by means of a stop safety feature effective in both directions. This stop safety feature may be provided in the form of adjustable limit stops, which are positioned near the bearing points.

This stop safety feature acts in tensile as well as in compressive direction. In an advantageous development, it is provided that the weighing housing is T-shaped in plan view. It is advantageous in this for the two T-beams to run at an acute angle to one another. Proposed in this connection is an arrangement in which, along the greater axis in plan view of the mixing vessel or along the axial elongate direction between the agitator and the drive mechanism, there is provided a longer arm, accommodating the weighing beam, from which arm, proceeding approximately from its middle, there extends a shorter arm, for example perpendicularly to the longer arm. Here also there is provided a horizontal division, which is defined by a lower and an upper portion of the housing, each housing portion being correspondingly T-shaped in plan view. The upper portion and the lower portion of the housing are each identically formed. Furthermore, it is proposed to form the surface in plan view of an upper portion in such a way that a surface centre-of-gravity lies in the region of the weighing beam, preferably in a point of intersection of a weighing-beam longitudinal axis with an axis aligned perpendicular to the longer arm and pointing in the direction of the shorter arm. Furthermore, it is proposed that the two T-beams of the weighing housing extend at an acute angle to one another. In this connection, an embodiment is preferred in which the short arm of the housing is at an angle of approximately 70°–75°, preferably 73°, to the long arm. However, there is also conceivable an embodiment in which the angle enclosed is 90°. The short arm, accordingly, is then perpendicular to the longer arm. In a further embodiment, it is provided that an arm of the T-shaped weighing housing is formed wedge-shaped.

This wedge-shaped arm is preferably the shorter arm of the weighing housing. For this purpose, it is furthermore proposed that the wedge shape of the one arm is defined by the projection of two arms of the lower portion and of the upper portion, these portions being themselves angled and handle-shaped. Preferably, the handle-shaped angled arm is the shorter arm of the housing, which is at an acute angle of approximately 73° to the long arm. When the two housing portions are, as already mentioned, identically formed, there is defined, by the arrangement one upon the other of the two housing portions and the short arms angled therewith in mirrored directions, the aforementioned wedge shape. Because of this arrangement, there is achieved an increased stability of the short arm. As mentioned, an embodiment of the weighing housing is preferred in which the upper portion and the lower portion are formed, at least with regard to their outer contours, to be identical in shape. Furthermore, it proves especially advantageous for the mixing bowl support and the drive mechanism to be located together on a chassis and for the chassis to act upon the weighing housing. The chassis has, preferably, a longitudinal extent along the axial elongate direction between the agitator and the drive mechanism or along the greater axis in plan view of the mixing vessel. On this chassis there are located, in one end region, the drive mechanism and, in the other end region, the mixing bowl support, including the heating unit. This complete assembly acts upon the weighing housing, here also the own weight of the chassis being allowed for in the determination of weight. Finally, it is proposed that the chassis acts upon the weighing housing by means of three bearing points located in end regions of the T-shape in plan view of the weighing housing. The bearing points are provided, accordingly, in the respective end regions of the longer arm aligned along the axial elongate extent between the agitator and the drive mechanism, and in the end region, for example, of the shorter arm disposed perpendicular to the longer arm.

Here also there is preferred a use of damping members, which are positioned between the chassis and the weighing housing, in the region of the bearing points. These damping members may be formed, for example, as rubber buffers. This dampened three-point bearing effects an optimum determination of weight and is also of advantage for the entire vibrational behaviour of the chassis on the weighing housing. On account of the large distances between the three points of the bearing, there is achieved a slight inclination of the chassis on the weighing housing. The distances of the bearing points from one another and, therefore, also the lengths of the longer arm and the shorter arm are, in advantageous manner, dimensioned in such a way that the bearing points define the corner points of an almost right-angled triangle, imaginary connecting lines between the bearing points of the shorter arm and the bearing points of the longer arm being at an angle which amounts to approximately 90° to 94°, preferably approximately 92°.

BRIEF DESCRIPTION OF THE DRAWING

FIG. 4 shows a weighing device of the food processor in plan view, as a detail representation, relating to a first embodiment, FIG. 5 shows a side view of the weighing device according to FIG. 4, FIG. 6 shows the front view of the weighing device, FIG. 8 shows the section according to the Line VIII—VIII in FIG. 4, FIG. 9 shows the plan view onto a chassis with the location of the weighing device represented in chain-dot outline, FIG. 10 shows the chassis according to FIG. 9 in side view with weighing housing represented in chain-dot outline, located under the chassis, FIG. 11 shows the front view of chassis and weighing housing according to FIG. 9, the weighing housing being represented in chain-dot outline, FIG. 15 shows a representation corresponding to FIG. 7, likewise relating to the second embodiment, FIG. 16 shows the section according to the Line XVI—XVI in FIG. 15, FIG. 17 shows a selective enlargement from FIG. 16, representing a stop safety feature between the two housing portions, and FIG. 18 shows a further selective enlargement from FIG. 16, showing a bearing point of a chassis represented in chain-dot outline on the weighing housing.

DETAILED DESCRIPTION OF THE PREFERRED EMBODIMENTS

Figure 1:
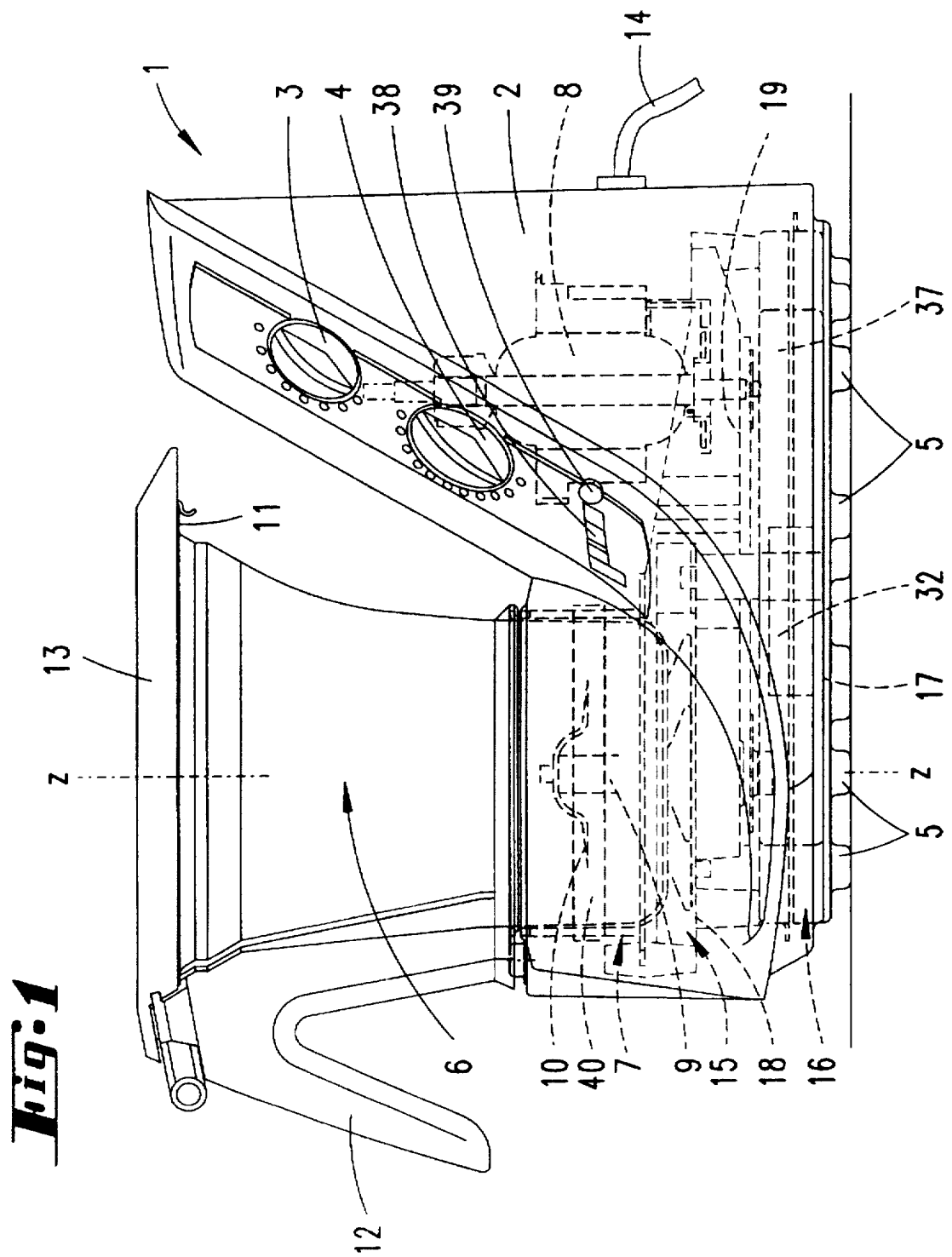
FIG. 1 shows a food processor with a mixing vessel, according to the invention, in side view.
Figure 2:
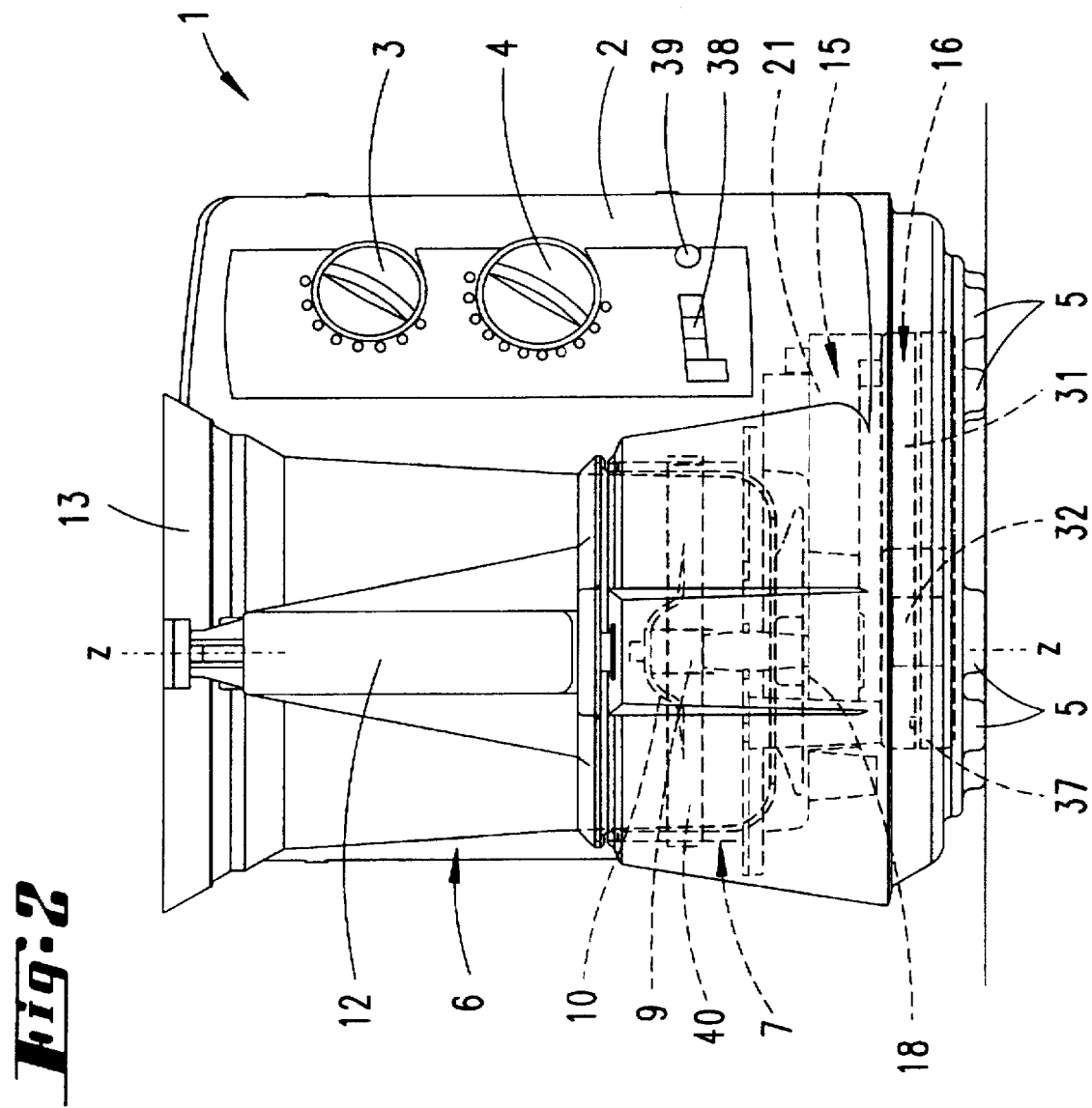
FIG. 2 shows the food processor in front view.
Figure 3:
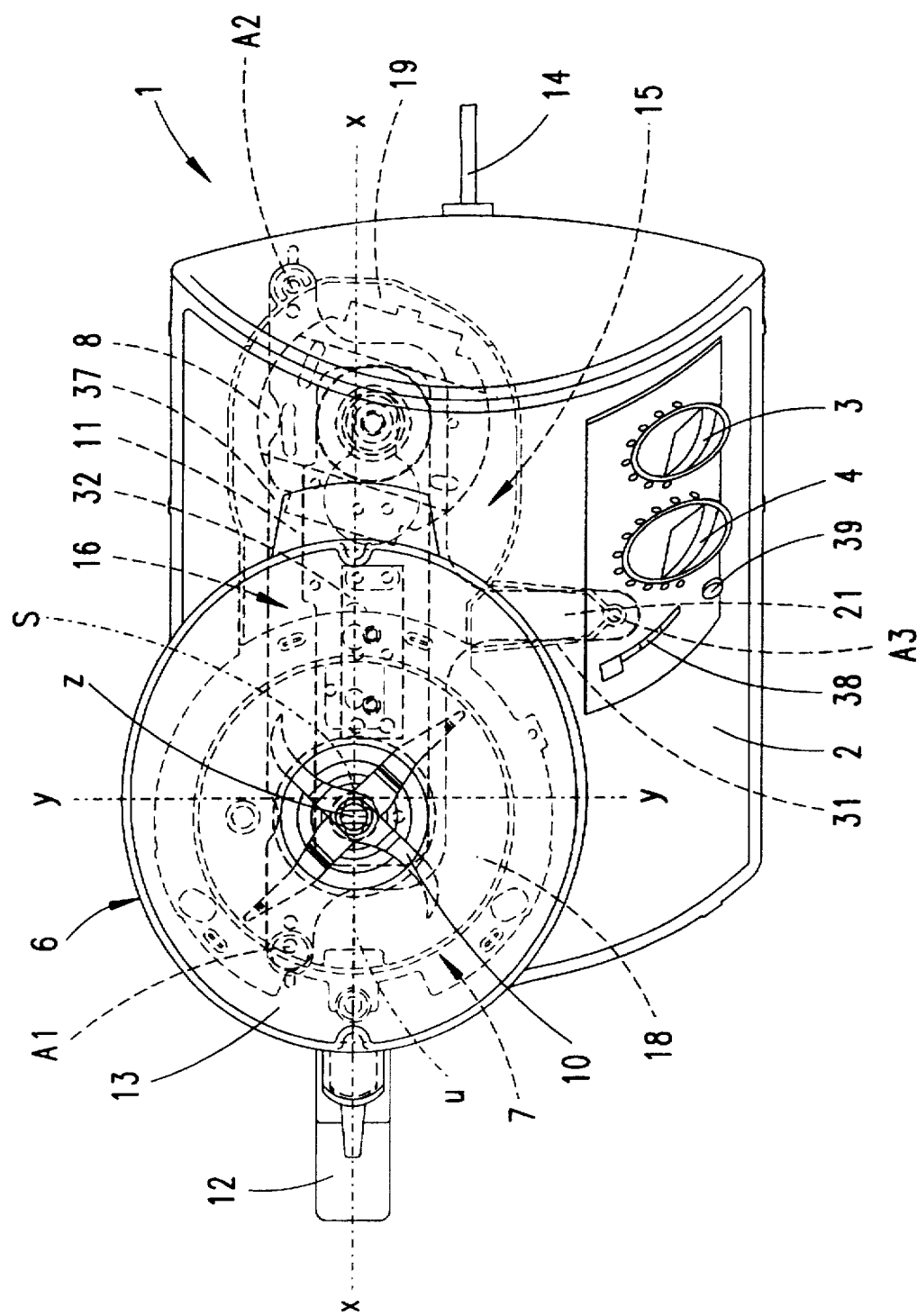
FIG. 3 shows the food processor in plan view.
Figure 7:
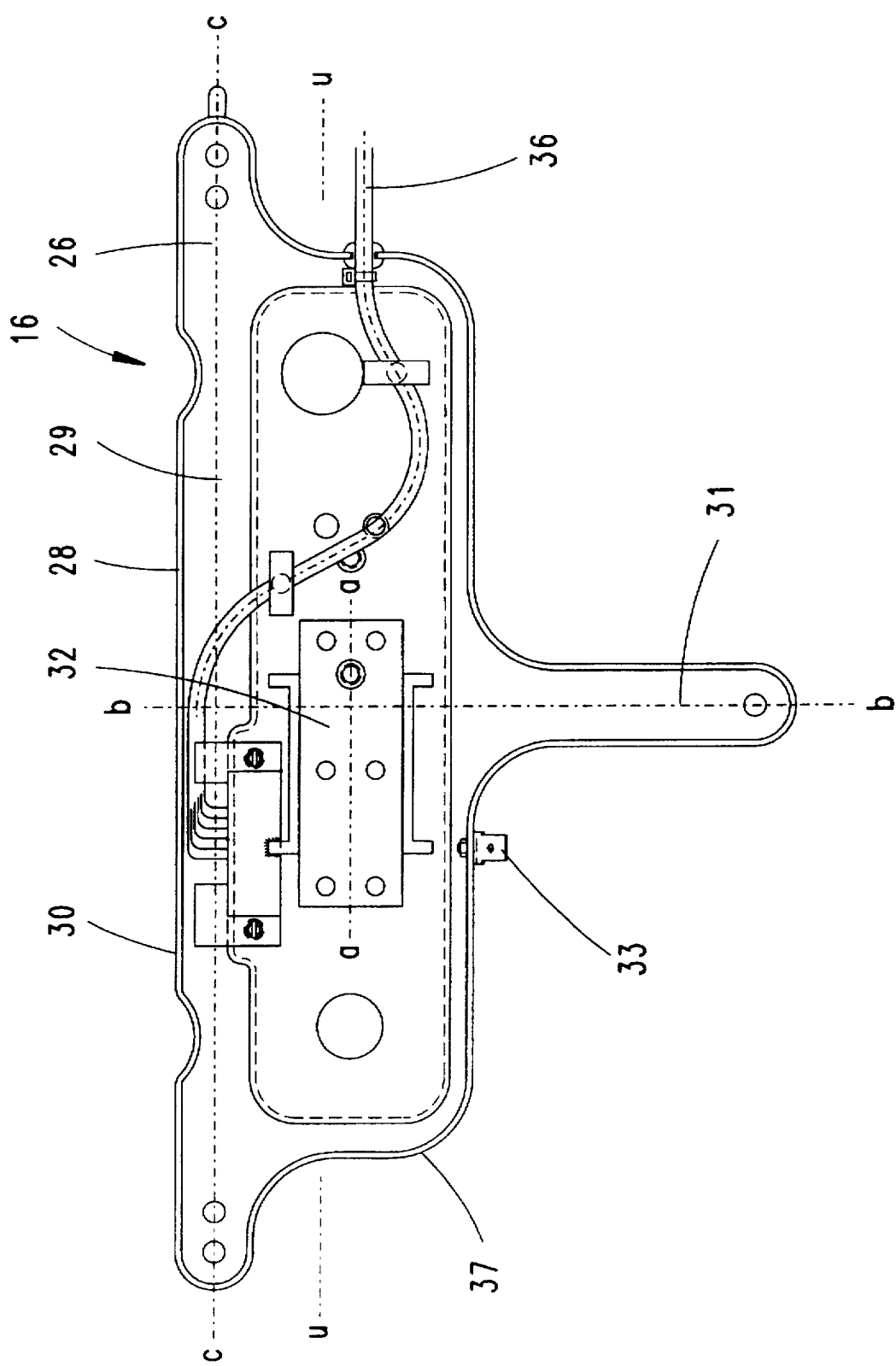
FIG. 7 shows the weighing device according to FIG. 4, likewise in plan view, but after removal of a housing upper portion.
Figure 12:
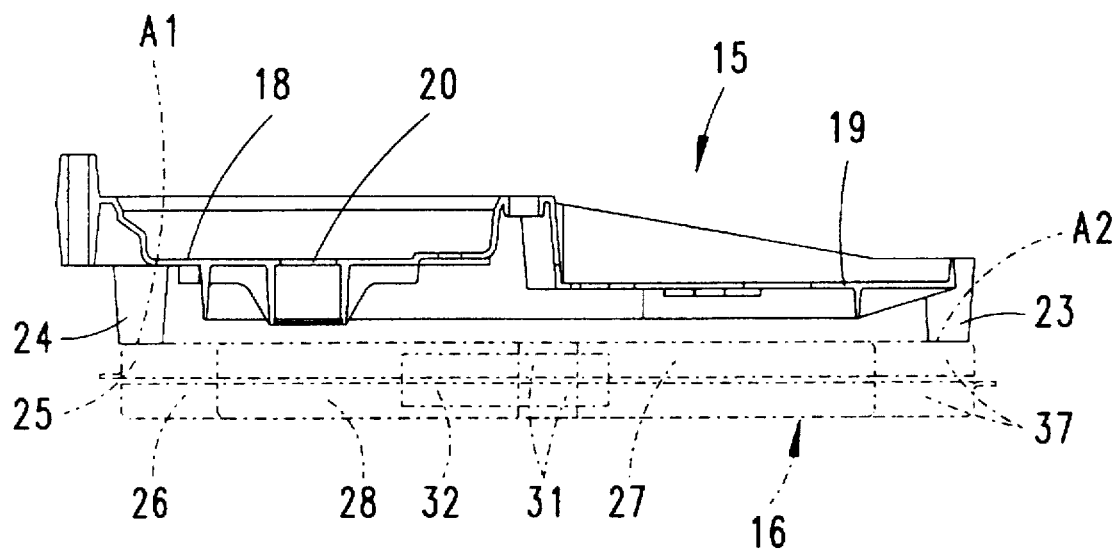
FIG. 12 shows the section according to the Line XII—XII in FIG. 9.
Figure 13:
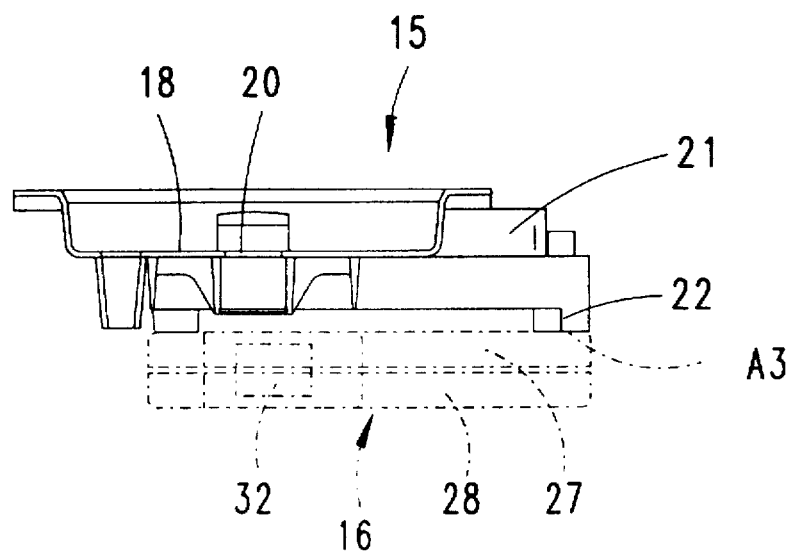
FIG. 13 shows the section according to the Line XIII—XIII in FIG. 9.

The food processor represented in FIGS. 1 to 3 has a housing 2 in which there are provided two rotary switches 3, 4. The housing 2 has, furthermore, feet 5 on the underside and, on the rear side, an electrical cable connection 14.

For the purpose of mounting a mixing vessel 6 in the food processor 1, the latter is provided with a support 7. A drive mechanism 8 located in the housing 2, for example in the form of an electric motor, drives, by means of a non-represented toothed belt or the like and by means of a drive shaft 9 aligned vertically, coaxially with a vertical axis z of the food processor 1, an agitator 10 disposed within the mixing vessel 6, in the base region, which agitator is power-connected, by means of a coupling arrangement, to the drive shaft 9. The speed of the agitator 10 is adjusted by means of the rotary switch 4.

The mixing vessel 6 is formed to be oval in its upper, open region, there being provided, in elongation of the greater axis x in plan view, a spout 11 projecting beyond the edge of the mixing vessel 6. The spout 11 points, with mixing vessel 6 inserted in the housing 2, in the direction of the housing portion provided with the rotary switches 3, 4. At the end of the greater axis x lying opposite the spout 11, the mixing vessel 6 is provided with a jug handle 12. This jug handle 12 extends over the entire height of the mixing vessel 6.

The space defined in the mixing vessel 6 is covered by a vessel cover 13. This vessel cover 13 sits to the greatest possible extent in a positively and radially sealing manner on the upper edge of the mixing vessel 6.

As is to be recognised from FIG. 3, the oval plan of the mixing vessel 6, in particular the projection of the upper region of the mixing vessel 6, has a ratio of greater axis x to lesser axis y of approximately 1.2:1. The point of intersection S of the two axes x and y in the upper region of the mixing vessel 6 is displaced from the vertical z axis along the x axis in the direction of the spout 11, namely, in the embodiment shown, by approximately 3 to 4 mm. Because of this arrangement, there is effected, with increasing filling of the mixing vessel 6, a displacement of the centre of gravity along the x axis in the direction of the spout 11.

In the region of the support 7, there is provided a heater enclosing the latter, in the form of a resistance heating wire, by means of which the lower region of the mixing vessel 6 may be heated.

In the housing 2, there is furthermore provided a chassis 15, which is supported on a weighing device 16. The weighing device 16 is located, here, on a housing base 17.

The chassis 15 is represented in detail in FIGS. 9 to 13. From the plan view in FIG. 9, it is to be seen that the chassis 15 is longitudinally extended in plan view, there being provided, in an end region, a plate-shaped support base 18 for the mixing vessel 6. The support base 18 is formed to be circular and has a bowl-like cross-section (compare FIGS. 12 and 13). In the end region lying opposite the support base 18, there is provided a mounting base 19 on which the drive mechanism 8 is located.

The longitudinal axis u of the chassis in plan view runs through the centre point of the support base 18 and through the mounting base 19. In the centre of the support base 18, there is provided a circular opening 20 for the passage of the drive shaft 9.

perpendicular to the longitudinal u axis, there is moulded onto the chassis 15, approximately centrally in relation to the longitudinal extent of the chassis 15, a bracket arm 21. This bracket arm 21 has, at its free projecting end, a downwardly-directed supporting foot 22, formed to be frusto-conical in shape.

On the side of the longitudinal u axis directed away from the bracket arm 21, there are provided, spaced apart from that axis, two further, likewise downwardly-directed, frusto-conically shaped supporting feet 23 and 24, located respectively at the ends of the chassis 15.

The first embodiment of a weighing device 16, represented in FIGS. 4 to 8, is T-shaped in plan view and comprises, substantially, an upper portion 25 and a lower portion 26, each correspondingly formed in plan view. The upper portion 25 has, at the outside edge, a circumferential, downwardly-directed upper-portion wall 27. Correspondingly, the lower portion 26 has an upwardly-directed lower-portion wall 28. The weighing space defined between upper portion 25 and lower portion 26 is indicated by the reference number 29.

As is to be seen in particular from FIGS. 4 to 6, upper portion 25 and lower portion 26 are identically formed. This arrangement offers, with regard to production, the advantage that, to form a weighing housing 37, only two identically formed housing portions need to be produced, and, after turning one portion about the horizontal axis, placed one upon the other. The housing portions produced are thus useable both as upper portion 25 and as lower portion 26.

The longer arm 30 extending in the direction of the longitudinal u axis is aligned to correspond to the longitudinal extent of the chassis 15, the dimension of the length of the arm 30 being less than the dimension of the longitudinal extent of the chassis 15. However, the long arm 30 is so dimensioned that the centres of the support base 18 and of the mounting base 19 of the chassis 15 and, therefore, the centres of gravity of the drive mechanism 8 and of the mixing vessel 6 with the support 7 lie in the region of the weighing device 16. The width, i.e. the extent perpendicular to the longitudinal u axis, amounts to approximately one third of the length of the long arm 30.

Centrally in the longitudinal extent of the weighing device 16, the latter has a weighing arm 31 which is at an acute angle beta to the longitudinal u axis, the angle beta, in the embodiment shown, amounting to 90°. The distance from the longitudinal u axis to the free end of the weighing arm 31 corresponds to that between the longitudinal u axis and the free end of the chassis bracket arm 21. Also, the width of the weighing arm 31 is matched to that of the bracket arm 21 of the chassis 15, so that on disposition of weighing device 16 and chassis 15 one upon the other, there results almost an overlapping of bracket arm 21 and weighing arm 31.

In the weighing space 29, there is provided a weighing beam 32 which is aligned along the longitudinal u axis. This weighing beam 32 is provided with non-represented strain gauges.

Upper portion 25 and lower portion 26 of the weighing device 16 are joined to one another by means of the weighing beam 32, the upper portion 25 being held captive on the lower portion 26 by means of non-represented stop safety features. The lower portion 26 is firmly anchored to the housing base 17.

The surface of the upper portion 25 in plan view is advantageously formed in such a way that a surface centre-of-gravity S lies approximately in the point of intersection of a weighing-beam longitudinal axis a with a weighing extension-arm longitudinal axis b, which is aligned perpendicular to the longitudinal axis c of the long arm 30.

Furthermore, the weighing device 16 has a plug-type lug 33, onto which there is pushed a cable 35 provided with a cable terminal 34. The power supply of the weighing device 16 and the routing of the measured data to an electronic evaluating circuit is effected by means of a cable loom 36.

The chassis 15 is located on the weighing device 16 in such a way that the supporting feet 22 to 24 are supported on corresponding bearing points A1 to A3 by means of non-represented damping elements in the form of rubber buffers, by virtue of which the chassis 15 acts upon the weighing housing 37 by means of these three bearing points A1 to A3 located in the end regions of the T-plan of the weighing housing 37 defined by the upper portion 25 and the lower portion 26. The bearing points A1 and A2, which are impinged upon by the supporting feet 23 and 24, are located in the end regions of the long arm 30 at a spacing from the longitudinal u axis. On the upper side of the projecting weighing arm 31, there is provided the bearing point A3 corresponding to the supporting foot 22.

The spacings between the supporting points A1 to A3 with respect to one another and, therefore, also the lengths of long arm 30 and weighing arm 31, are so dimensioned that the bearing points A1 to A3 define the corner points of an almost right-angled triangle, the imaginary connecting lines between the bracket arm bearing point A3 and the bearing points A1 and A2 being at an angle alpha to one another. This angle alpha amounts to approximately 90° to 94°, preferably approximately 92°.

The weighing beam 32 is, as already mentioned, aligned along the longitudinal u axis and along the corresponding axis, in the installed condition, between the agitator 10 and the drive mechanism 8 and along the greater axis x of the mixing vessel 6 in plan view. The own weights of drive mechanism 8, support 7, of the heater 40 and of the mixing vessel 6 act constantly upon the weighing device 16 and on the weighing beam 32. This is allowed for in an electronic circuit, which is so arranged that the weight is only displayed by means of a digital display 38 when, in addition to their own weight, further weights are added. When, accordingly, the food processor 1 is switched on, the digital display 38 displays a tare point. If a weight display is desired, a reset button 39 is pressed, after which, in the digital display, zero grams is shown. Only after filling ingredients into the mixing vessel 6 does this weight act additionally on the weighing device 16, which increase in weight is displayed. In this connection, there exists the possibility of setting, at any time, the digital display 38 to zero grams by means of the reset button 39, in order to facilitate a further weighing. In this connection, there may be further weighed up to 2.5 kg in a weighing step, and in total, up to 7.5 kg. An electronic blocking apparatus effects, in this, that a weighing is permitted only on standstill of the agitator 10.

As already mentioned, there is effected, by the oval, partially eccentric arrangement of the mixing vessel, a displacement of the centre of gravity, with increasing filling, along the x and u axes.

Because of the alignment of the weighing beam 32 along this direction of displacement of the centre of gravity, there is constantly provided a correct measurement of weight. Furthermore, by this alignment of the weighing beam 33, any tipping forces are kept very small.

In FIGS. 14 to 18, there is represented a second embodiment of the weighing device 16. As is to be recognised in particular from FIG. 14, there is provided, also in this embodiment, a longer arm 30 extending parallel to the longitudinal u axis. This arm 30 is dimensioned, here, in such a way that the centres of the support base 18 and of the mounting base 19 of the chassis 15 represented in chain-dot outline and, therefore, the centres of gravity of the drive mechanism 8 and of the mixing vessel 6 with the support 7 lie in the region of the weighing device 16.

The weighing housing 37 is likewise defined by an upper portion 25 and a lower portion 26, with formation of a weighing space 29. The upper portion 25 has, proceeding from the long arm 30, at an acute angle beta' of approximately 70° to 75°, preferably 73°, a short arm 31'.

The lower portion 26 is —corresponding to the first embodiment—formed identically to the upper portion 25, but turned about a horizontal axis, so that by the arrangement, one upon the other, of an upper and a lower portion, there is formed the weighing housing 37. Correspondingly, the lower portion 26 also has a short arm 31" at an acute angle beta" to the long arm 30. In arrangement, one upon the other, of lower and upper portion, the two short arms 31' and 31" define a wedge-shape-formed weighing arm 31, the free ends of both short arms 31' and 31" entering into position one upon the other to form the bearing point A3. A weighing arm axis b, which, proceeding from the bearing point A3, extends perpendicular to the longitudinal axis c of the long arm 30, defines, in this connection, an axis of symmetry for the entire weighing housing 37. Accordingly, this weighing arm axis b is aligned correspondingly centrally-between the two bearing points A1 and A2 located on the long arm 30.

Corresponding to the first embodiment, the spacings between the bearing points A1 to A3 with respect to one another and, therefore, also the lengths of the long arm 30 and of the short arms 31' and 31" are so dimensioned that the bearing points A1 to A3 define the corner points of an almost right-angled triangle. Here also, the angle alpha amounts to approximately 90° to 940°, preferably approximately 92°.

Figure 14:
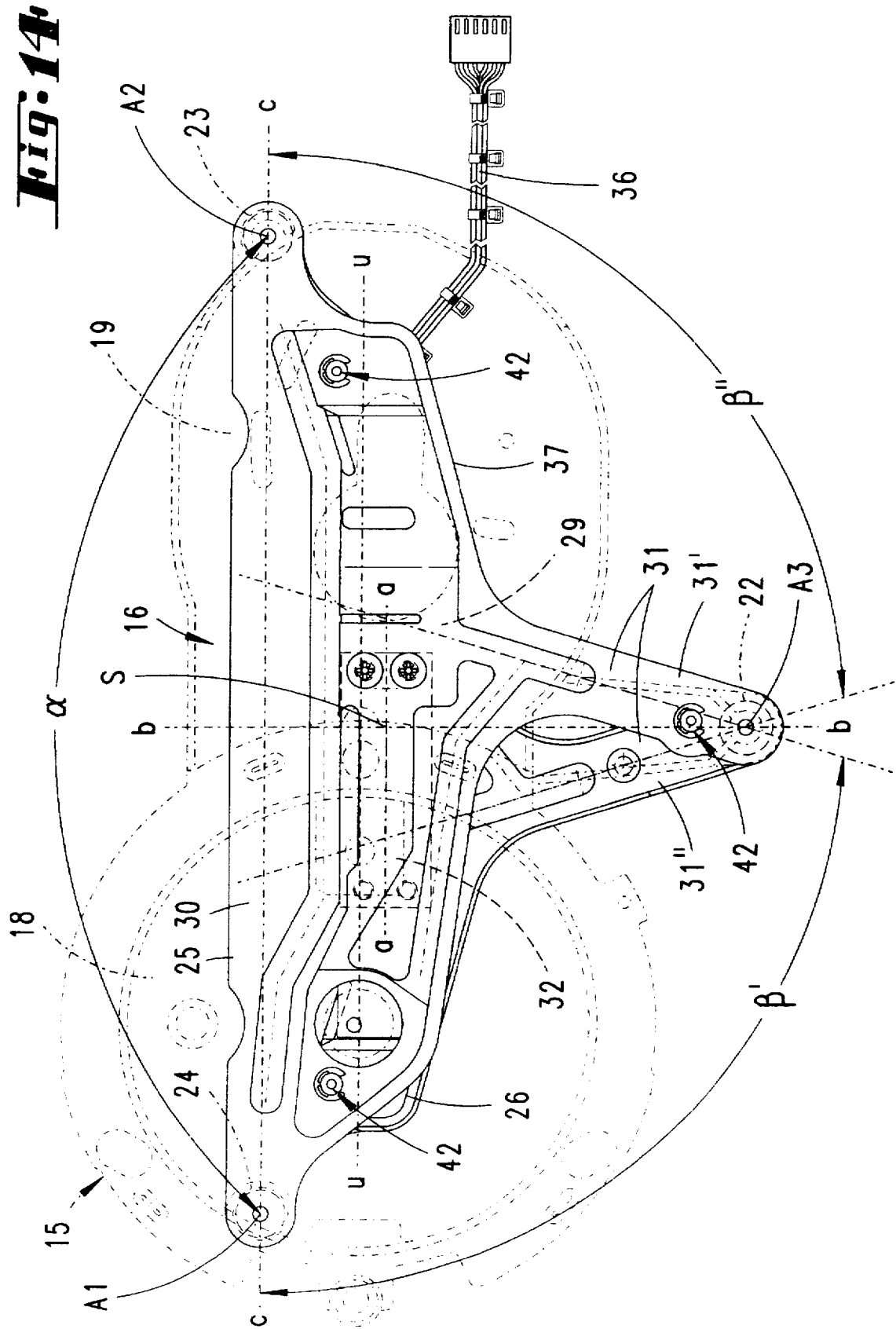
FIG. 14 shows a representation corresponding to FIG. 4, but relating to a second embodiment of the weighing device.

Furthermore, the weighing housing 37 is constructed, also in this embodiment, so that a surface centre-of-gravity point S of the upper portion 25 lies approximately in the point of intersection of the weighing-beam longitudinal axis a with the weighing arm axis b (compare FIG. 14).

Lower portion 26 and upper portion 25 are joined to one another only in the region of the weighing beam 32, in that the upper portion 25 is secured, by means of screws 41, in the region of one end, seen in the direction of the longitudinal axis a, of the weighing beam 32. A corresponding securing of the lower portion 26 is effected in the end region of the weighing beam 32 lying opposite that end, to the underside of the weighing beam 32.

The weighing beam 32 is provided with a capacitive measurement sensor. In this connection, the spacing between two capacitor plates changes with a change in weight.

The power supply and routing of measured data is effected, as in the previously described embodiment, by means of a cable loom 36.

Near the bearing points A1 to A3, there are provided, in both perpendicular directions, effective stop safety features 42. For this purpose, there is provided in each case, fixed on the lower part 26, a set screw 43 penetrating into the weighing space 29. Onto this set screw 43, there is screwed a spacing nut 44, whose upwardly-directed, i.e. in the direction of the upper portion 25, region is tapered in cross-section. In the region of the transition to the portion tapered in cross-section, there is formed a stop collar 45. The cross-sectionally reduced region of the spacer nut 44 passes through the upper portion 25 in the region of correspondingly located bores 46. An upper stop safety feature is formed by a securing ring 47. The upper portion is, accordingly, held captive between-the securing ring 47 and the stop collar 45, there being provided a play, the dimension of which corresponds to approximately twice the wall thickness of the upper portion 25 in this region. These stop safety features 42 serve, on the one hand, as guide elements for the upper portion 25 and, on the other hand, these stop safety features protect the weighing beam 32 from non-permissible deformation. The stop safety features 42 act, as already mentioned, in tensile as well as in compressive direction.

The lower portion 26 is secured to the housing base 17 by means of pins 48 located on the base, each pin being provided with a thread, for which, on the under side, corresponding nuts are screwed onto these pins 48.

Corresponding to the first embodiment, the chassis 15 is disposed on the weighing device 16 in such a way that the supporting feet 22 to 24 are supported on the corresponding bearing points A1 to A3, this support being effected not directly, but rather by means of damping elements 49, which may be provided, for example, in the form of rubber buffers. These damping members are secured in the region of the bearing points A1 to A3 by means of the screws 50. The supporting feet 22 to 24 of the chassis 15 have corresponding recesses 51, into which the damping members 49 enter.

The mode of operation, in particular the display of the weights to be established, corresponds to that of the first embodiment.

I claim:

1. A food processor comprising
   a mixing vessel and a drive mechanism for an agitator in the mixing vessel, the mixing vessel being heatable in its lower region, and
   a weighing device, and wherein the weighing device senses the weight of a mixing bowl support, including a heater unit.

2. A food processor according to claim 1, wherein the weighing device support components to be weighed by means of a three-point bearing.

3. A food processor according to claim 1, wherein bearing points are each associated with end regions of weighing device.

4. A food processor according to claim 3, wherein the bearing points are each fitted with a damping member.

5. A food processor according to claim 1, wherein the weighing device records the weight of the drive mechanism.

6. A food processor according to claim 1, further comprising a weighing beam, and the weighing beam is aligned along an axial elongated extent between the agitator and the drive mechanism.

7. A food processor according to claim 6, wherein the mixing vessel is oval in shape in plan view and the weighing beam is aligned along the greater axis in plan view.

8. A food processor according to claim 6, wherein the weighing beam is accommodated in a weighing housing having a horizontal division.

9. A food processor according to claim 8, wherein an upper portion of the weighing housing is held captive on a lower portion by means of a stop safety effective in both directions.

10. A food processor according to claim 8, wherein the weighing housing is T-shaped in plan view.

11. A food processor according to claim 8, wherein two T-beams of the weighing housing extend at an acute angle to one another.

12. A food processor according to claim 10, wherein an arm of the T-shaped weighing housing is formed wedge-shaped.

13. A food processor according to claim 12, wherein a wedge shape of the arm is defined by a projection of two arms of a lower portion and of an upper portion of the weighing housing, the two arms being angled and handle-shaped.

14. A food processor according to claim 13, wherein the upper portion and the lower portion are formed, at least with regard to their outer contours, identical in shape.

15. A food processor according to claim 1, further comprising a chassis and a weighing housing, and wherein the mixing bowl support and the drive mechanism are fully located on the chassis, and the chassis acts upon the weighing housing.

16. A food processor according to claim 15, wherein the chassis acts upon the weighing housing by means of three bearing points located in end regions of the weighing housing which is T-shaped in plan view.

17. A food processor according to claim 16, further comprising rubber buffers between said bearing points and said chassis.

* * * * *